United States Patent [19]
Melbinger et al.

[11] Patent Number: 5,558,406
[45] Date of Patent: Sep. 24, 1996

[54] METHOD OF MAKING AND WHEEL ASSEMBLY FOR INFLATABLE TIRE

[75] Inventors: Donald Melbinger, Placentia, Calif.; Richard Clement, La Grange, Ill.

[73] Assignee: Midwest Rim & Wheel Co., Inc., Chicago, Ill.

[21] Appl. No.: 113,217

[22] Filed: Aug. 27, 1993

[51] Int. Cl.$^6$ .......................... B60B 21/00; B21B 13/02; B21K 1/38
[52] U.S. Cl. ................. 301/65; 29/894.351; 29/894.353
[58] Field of Search ............ 29/894.351, 894.353, 29/894.35, 894.322; 228/152, 155; 301/65

[56] References Cited

FOREIGN PATENT DOCUMENTS 2620060  3/1989  France ................. 29/894.351

Primary Examiner—P. W. Echols
Attorney, Agent, or Firm—Banner & Allegretti, Ltd.

[57]  ABSTRACT

A wheel made by extruding a wheel rim form from a light metal alloy, the rim having a first tire-retaining flange; cutting the rim form to a length longer than the desired wheel circumference; joining the ends of the rim form to make a rim hoop; circumpressing the rim hoop to the desired circumference; providing a center from a light metal; and, joining the rim hoop and the wheel center along the second side of the rim to form the wheel. A second tire-retaining flange is also provided, and may be fabricated either as an integral portion of the center that is joined to the rim hoop, or as an integral portion of the rim hoop for joining to the center.

23 Claims, 2 Drawing Sheets

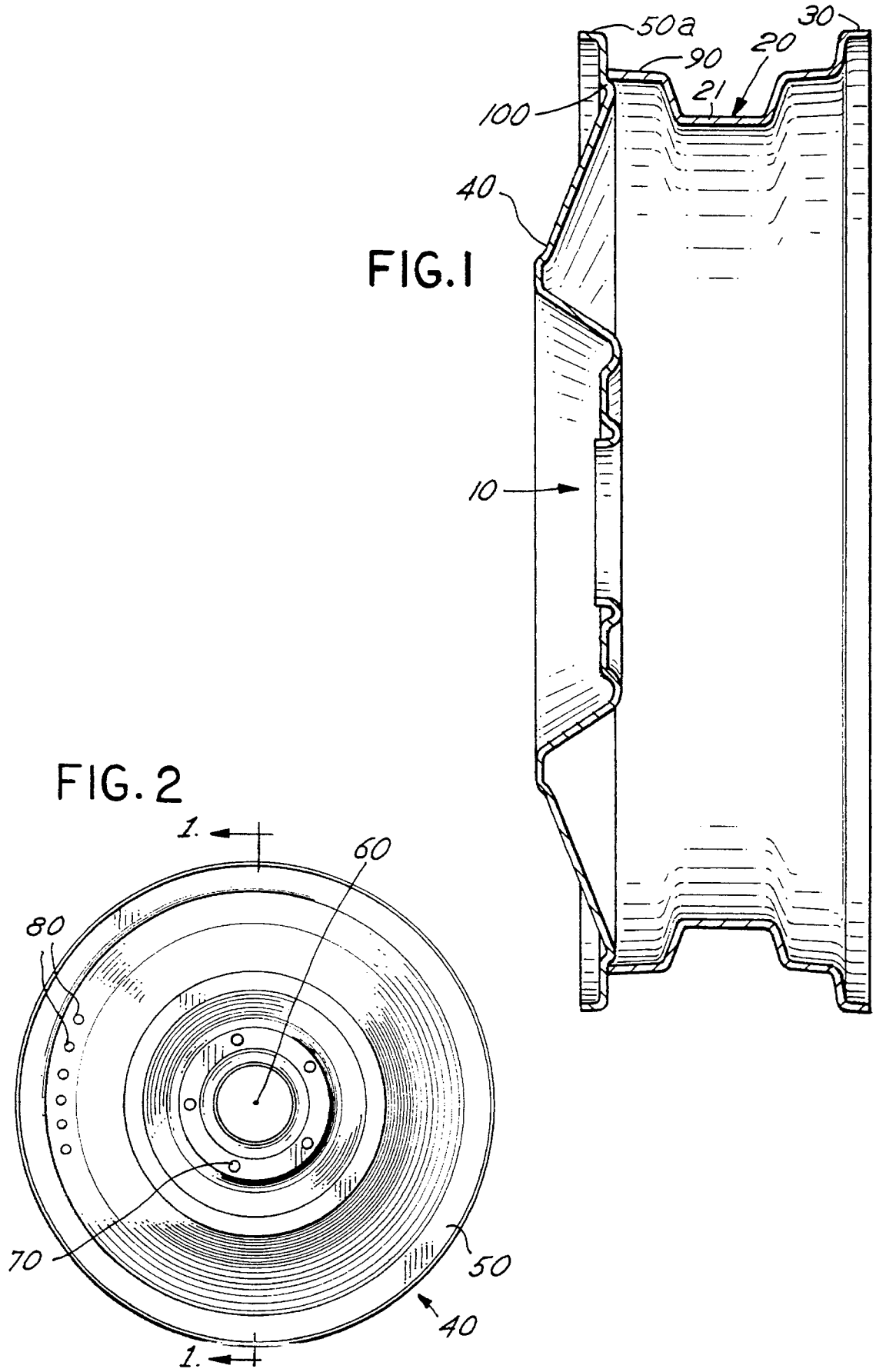

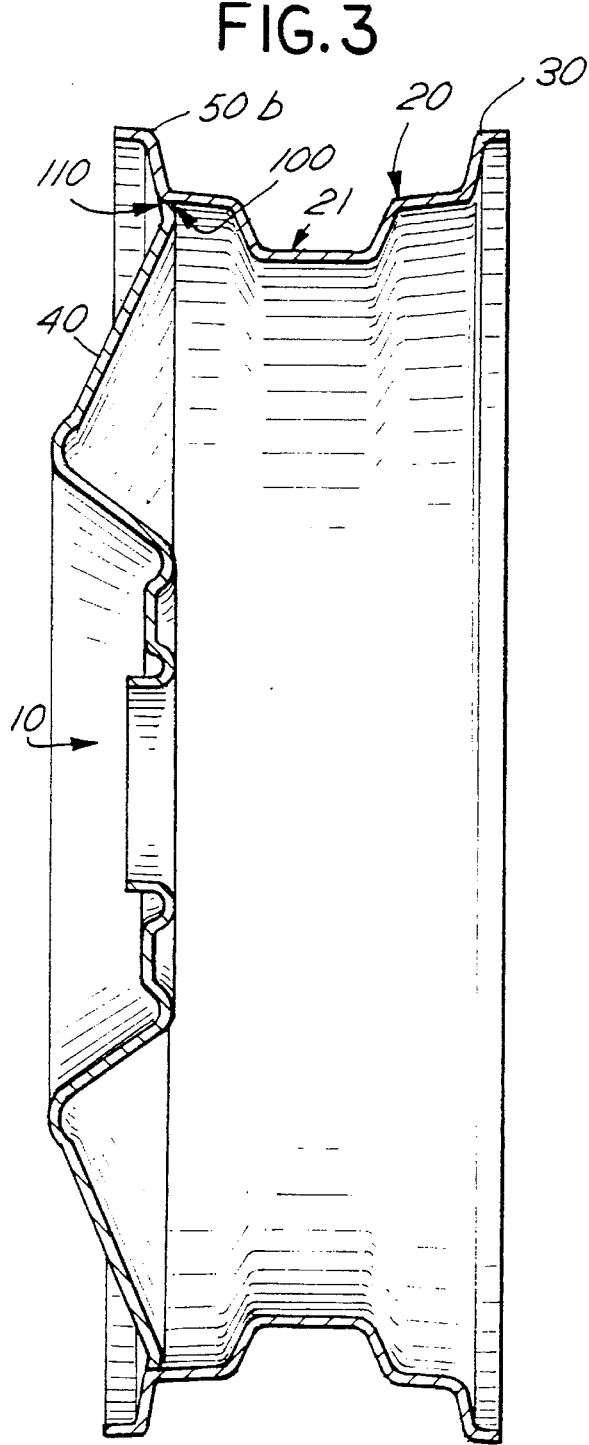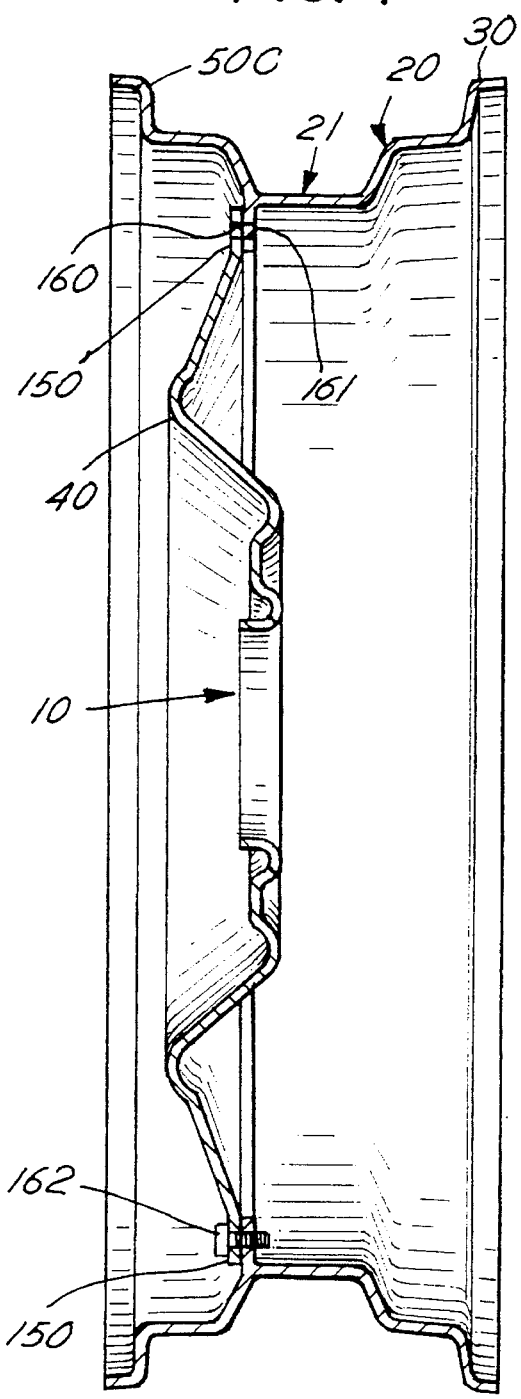

METHOD OF MAKING AND WHEEL ASSEMBLY FOR INFLATABLE TIRE

The present invention relates to lightweight, high-strength wheels for use with inflatable tires on automobiles and on other vehicles.

BACKGROUND OF THE INVENTION

Tires for use on automobiles, trucks, and similar vehicles are made of vulcanized rubber that is formed to be mounted on a wheel that includes a tire-retaining rim. Such wheels conventionally are made from one or more pieces of metal, and may be cast or assembled from cast parts. Depending upon the metal that is used to make the wheel, parts of the wheel may also be extruded and/or fabricated into the desired shapes for assembly as by, for example, welding.

Automobiles designed for racing are weight-sensitive, and therefore it has been desirable to use wheels made from light metals, such as magnesium, aluminum, and alloys of those and other elements. Such alloys are particularly desirable when they permit easy fabrication as a result of ductile properties, yet at the same time impart structural strength to support the heavy loads endured by the wheels without requiring otherwise unnecessary quantities of metal to form rigid structural members. These same concerns have increasingly been present in conventional automobiles designed for consumer applications, and for trucks and other vehicles, because of demands for fuel efficiency, requiring lighter-weight vehicles.

Also of concern to the automobile industry is the desire to use a lesser quantity of metals and alloys in each part of the automobile to reduce costs. That industry has sought to use such materials in a manner that minimizes the number of steps, and the amount of energy, employed in the manufacturing process, thereby to reduce costs. In addition, manufacturing that reduces waste products is particularly desirable since it minimizes environmental degradation resulting from the manufacturing process.

To that end, several lightweight wheels have been proposed. These include Ridout, U.S. Pat. No. 4,345,360, Martenet, U.S. Pat. No. 2,992,045, Brown, U. S. Pat. No. 4,693,520, Walther, U.S. Pat. No. 4,624,038, Zulauf, U.S. Pat. No. 4,487,456, Lester et al., U.S. Pat. No. 4,256,348, and Schmidt, U.S. Pat. No. 4,190,297. Some of the disadvantages of the wheels described in these patents are set forth below.

Ridout discloses a wheel made from a magnesium-silicon alloy of aluminum that is extruded to form a rim. That rim includes a flange that is later roll-pressed to form a wheel "center" for joining the wheel to a hub and axle in an automobile or other vehicle. The process for making the rim disclosed by Ridout includes the step of expanding the rim to the desired size, which precludes use of many lighter-weight, magnesium-based alloys that cannot be expanded following extrusion.

Martenet discloses an extruded wheel rim that includes a hollow section, or cross-piece, extruded integrally with the rim to absorb the maximum load when the tire and wheel are in service. The inclusion of one or more such cross-pieces undesirably adds to the weight of the wheel.

Zulauf relates to a process of using the wheel rim as a mold to form a portion of the wheel body in an aluminum, steel or magnesium wheel, thereby reducing the number of steps required to manufacture the wheel and reducing the likelihood that the wheel will not be true at the end of the manufacturing process. The process disclosed in Zulauf, however, is unduly labor intensive because it requires a precise setup to construct a mold using the wheel rim, among other disadvantages.

Walther relates to a vehicle wheel made from an aluminum or magnesium alloy that is cast to form a rim and then shear-formed into the desired rim configuration, reducing the thickness of the rim and also its strength. The casting process requires additional steps to finish the rim by removing undesirable surface elements and residue from casting that may disrupt the roll-forming process or adversely affect the integrity of a tire placed onto the rim.

Brown discloses a wheel fabricated from aluminum, steel or magnesium, and alloys thereof, that uses detachable spokes in order to provide the option of reducing the wheel weight. The wheel itself is preferably cast, but may be forged, extruded or spun into the appropriate shape, and includes a flange or center that is bolted on. The use of bolt construction adds steps to the fabrication process, increasing both the margin for error and the cost of manufacturing. That construction also undesirably adds to the weight of the finished wheel.

Schmidt relates to a wheel rim made from an extruded alloy of aluminum or magnesium that is reinforced by a circumferential steel strip. Thus, according to Schmidt, it is desirable to add the step of embedding (as by welding) a strip of a higher strength metal to a lower strength, lightweight metal. That, however, undesirably adds to both the manufacturing costs and the weight of the finished wheel.

Lester relates to a wheel for use in a motorcycle that is made from an extruded rim section that is elongated beyond its yield point prior to fabrication into the desired configuration. Thereafter, the expanded wheel is further stretched by 2–3% and joined to a center, around which the rim is compressed to fit.

Even these designs, however, have not satisfied the demand in the marketplace for lightweight wheels that are both strong and inexpensive to produce, because of the problems identified.

SUMMARY OF THE INVENTION

In order to overcome the obstacles and problems noted in prior wheel designs, this invention contemplates the manufacture of a wheel by extruding a wheel rim form from a light metal alloy, the rim having a first tire-retaining flange; cutting the rim form to a length longer than the desired wheel circumference; joining the ends of the rim form to make a rim hoop; circumpressing the rim hoop to the desired circumference; providing a wheel center from a light metal; and, joining the rim hoop and the wheel center along the second side of the rim to form the wheel. A second tire-retaining flange is also provided, and may be fabricated either as an integral portion of the center that is joined to the rim hoop, or as an integral portion of the rim hoop for joining to the center.

It is an object of the invention to provide a lightweight, high-strength wheel for use with inflatable tires on automobiles and on other vehicles.

It is another object of the invention to provide such a wheel that can be manufactured easily and inexpensively.

Still another object of the invention is to provide a process for making such a wheel that permits the use of magnesium and magnesium-based alloys, and other metals and alloys that cannot easily be expanded without adversely affecting material strength, by enabling the wheel to be formed without expanding the wheel rim to the desired wheel size.

BRIEF DESCRIPTION OF THE DRAWINGS

FIG. 1 is a sectional view of one embodiment of a wheel made according to the present invention taken substantially in the plane of line 1—1 of FIG. 2.

FIG. 2 is a plan view of the wheel shown in FIG. 1.

FIG. 3 is a sectional view of an alternative embodiment of a wheel made according to the present invention, which has the same frontal appearance as shown in FIG. 2, the section also taken substantially in the plane of line 1—1.

FIG. 4 is a sectional view of an alternative embodiment of the invention.

DETAILED DESCRIPTION OF THE INVENTION

As shown in FIGS. 1 and 3, the wheel of the present invention includes a rim 10 constructed from a light metal or alloy, preferably from a magnesium alloy and most preferably from AZ31 or AZ61 magnesium-aluminum alloys. The rim includes a body portion 20 and at least one flange portion 30 on the rearward potion of the wheel. Flange portion 30 extends generally perpendicularly from the body, and the body is generally parallel along its width at all points along the rim.

Rim 20 is formed by extruding a flat strip of a selected metal in the cross-sectional configuration 21 of part of the rim that is desired, as for example, the configurations 21 shown in FIGS. 1, 3 and 4. Such metal extrusion processes are well-known. The strip so formed is cut to a length greater than the circumference of the desired wheel size (preferably of not more than about two percent), to accommodate both welding and compressing. Thus, if the desired wheel size is 14 inches in diameter, the desired circumference is approximately 44 inches, and the extruded rim would be cut to a length of about 44.8 inches. The extruded strip is then heated to its softening point and coiled so that the two ends of the strip may be permanently joined. Joining preferably occurs through a butt-welding process that is well-known to those of skill in the art of wheel manufacture, and even more preferably occurs through a flash butt-welding process. In that process, the ends are placed in abutting relation to one another and exposed to a short high temperature energy pulse. That pulse, in combination with a pressure forcing the two ends together, permanently joins the ends to form a nearly seamless hoop. The exact temperature and pressure used in flash butt-welding will vary depending upon the metal used to the form rim 20.

Subsequently, the rim 20, now in hoop configuration, is circumpressed, i.e., compressed at all points along the circumference of the rim, to reduce the rim diameter and circumference to the desired size in the finished wheel and to ensure that the rim 20 is circular and true. The circumpressing process is particularly useful in connection with magnesium and magnesium-based alloys that are prone to stress cracking when subjected to tension forces normally imparted upon expansion, as in conventional wheel-manufacturing processes. In this process, the rim is contacted by a plurality of wedge-shaped compression segments, arranged in circular configuration around the rim. Under a load, these segments are uniformly pushed downward and, because of their wedge shape, inwardly, compressing the rim. Such devices are known to wheel manufacturers. The use of compression also desirably increases the resistance of the wheel to operating loads by augmenting the thickness of the rim and by increasing strain resistances tending to collapse the wheel due to radial forces.

To facilitate the circumpressing of the rim hoop, it is desirable with some metals to heat the rim hoop to about a temperature equal to the softening point of the metal, and after circumpressing to permit the rim hoop to return to ambient temperature. In the case of the preferred alloys, AZ31 and AZ61, this heating step prior to circumpressing has been found to be unnecessary to plastically deform the metal in circumpressing.

In a first embodiment of the invention, a second flange is added to the rim by joining the rim to a center section 40 at the frontward side of the rim. As shown in FIG. 1, the center section 40 is also made from a light metal, preferably the same metal as is used in the rim, and includes a second flange portion 50a that is a mirror image of flange 30 on the rim. Center section 40 may be made by any suitable, conventional means, such as stamping, casting or forging. As shown in FIG. 2, center 40 is generally circular and includes a central opening 60 to permit an axle or hub (not shown) to extend through the wheel, and a plurality of lug nut openings 70 to permit the wheel to be detachably joined to the hub and axle. Center 40 preferably includes a plurality of perforations, illustrated by perforations 80 in FIG. 2, that reduce the weight of the wheel. Such perforations, if included, may be of any size and shape desired except to the extent that they are so large or numerous that they adversely affect the structural integrity of the wheel and tend to permit collapse of the center, which supports the rim, under normal operating loads. Such perforations may also be configured to impart a desirable visual appearance to the wheel.

In this embodiment, the rim and center are joined at intersection 90 and/or 100, preferably by a circumferential weld extending along the entire circumference of the rim. The weld, or other joint so formed, is such that it will have a smooth surface that will not unfavorably contact a tire that is placed onto the wheel and cause a cut or tear in the tire material, thereby weakening the tire and possible leading to dangerous blow-out conditions when the tire and wheel are in service.

In an alternate embodiment of the invention, shown in FIG. 3, second flange 50b is extruded as an integral part of the rim 20, similarly to first flange 30. As a result, center 40 does not include the second flange 50b. Also resulting from this configuration is a change in the location of the weld used to join the center to the rim, which now occurs in locations identified by reference numerals 100 and/or 110.

In a third embodiment of the invention, shown in FIG. 4, rim 20 includes extension 150 that is formed integrally with rim 20 and extends radially inwardly from the inner surface of rim 20. Extension 150 is of sufficient thickness to withstand normal operating loads when the tire and wheel are in service, and using the preferred embodiment is about 5/16 inch thick. The second tire-retaining flange 50c is aim formed integrally with rim 20, as described above and shown in FIG. 3. Extension 150 is bored (as by drilling, for example) to form a plurality of holes 160 through its thickness to permit a center (not shown) to be permanently affixed; boring may occur prior to circumpressing or, preferably, after circumpressing. The center may include a plurality of bores 161 corresponding to adjacent bores 160 in the rim 20, and may be joined to the wheel by using a plurality of bolts 162 as shown in FIG. 4. The center may also be joined by other suitable means, such as by riveting or welding. The center 40 is intended to be similar in configuration and material to the center 40 shown in FIG. 1, but suitably modified to permit joining to extension 150.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A method for manufacturing a wheel of desired circumference, comprising the steps of:

extruding a wheel rim section from a light metal alloy, the rim section having a first tire-retaining flange at a first side and having a second side opposite the first side along the width of the rim section;

cutting the rim section to a length longer than the desired wheel circumference so that the rim section has two ends;

joining the ends of the rim section to make a rim hoop;

circumpressing the rim hoop to the desired circumference;

providing a wheel center from a light metal, the center including a second tire-retaining flange; and, joining the rim hoop and the wheel center along the second side of the rim to form the wheel.

2. The method of claim 1, wherein the light metal is selected from the group consisting of magnesium and magnesium-based alloys.

3. The wheel formed by the process of claim 2 wherein the ends of the rim section are joined by welding.

4. The method of claim 1, wherein the rim section is not more than about two percent longer than the desired circumference of the wheel.

5. The method of claim 1, wherein the ends of the rim section are joined by welding.

6. The method of claim 5, wherein the ends of the rim section are joined by butt welding.

7. The method of claim 1, wherein the center and rim section are made from the same light metal.

8. The method of claim 7, wherein the light metal is selected from the group consisting of magnesium and magnesium-based alloys.

9. The method of claim 1, wherein the rim hoop and center are joined along the entire circumference of the rim hoop.

10. The method of claim 9, wherein the rim hoop and center are joined by welding.

11. The method of claim 1 wherein the circumpressing step includes applying pressure at substantially all points along the circumference of the rim.

12. The method of claim 1, including the step of heating the rim hoop to a temperature substantially on the order of the softening point of the metal to facilitate the circumpressing of the rim hoop.

13. A method for manufacturing a wheel of desired circumference, comprising the steps of:

extruding a wheel rim section from a light metal alloy, the rim section having a first tire-retaining flange at a first side and having a second tire-retaining flange on a second side opposite the first side along the width of the rim section;

cutting the rim section to a length longer than the desired wheel circumference so that the rim section has two ends;

joining the ends of the rim section to make a rim hoop;

circumpressing the rim hoop to the desired circumference;

providing a center from a light metal;

joining the rim hoop and the wheel center along the second side of the rim to form the wheel.

14. The method of claim 13, wherein the light metal is selected from the group consisting of magnesium and magnesium-based alloys.

15. The wheel formed by the process of claim 14, wherein the ends of the rim section are joined by welding.

16. The method of claim 13, wherein the rim section is not more than about two percent longer than the desired circumference of the wheel.

17. The method of claim 13, wherein the ends of the rim section are joined by welding.

18. The method of claim 17, wherein the ends of the rim section are joined by butt welding.

19. The method of claim 13, wherein the center and rim section are made from the same light metal.

20. The method of claim 19, wherein the light metal is selected from the group consisting of magnesium and magnesium-based alloys.

21. The method of claim 13, wherein the rim hoop and center are joined along the entire circumference of the rim hoop.

22. The method of claim 21, wherein the rim hoop and center are joined by welding.

23. A method for manufacturing a wheel of desired circumference, comprising the steps of:

extruding a wheel rim section from a light metal alloy, the rim section having a first tire-retaining flange at a first side and having a second tire-retaining flange on a second side opposite the first side along the width of the rim section, and having an extension protruding from the rim section in a direction opposite the direction in which the first and second flanges protrude, the extension including a plurality of holes for joining the rim section to a center;

cutting the rim section to a length longer than the desired wheel circumference so that the rim section has two ends;

joining the ends of the rim section to make a rim hoop;

circumpressing the rim hoop to the desired circumference;

providing a center from a light metal;

joining the rim hoop and the center at the holes in the extension to form a wheel.

* * * * *